United States Patent [19]

Lowe et al.

[11] Patent Number: 5,738,372
[45] Date of Patent: Apr. 14, 1998

[54] DEVICE FOR PRESSURE RELIEF DURING BONFIRE AND TELL-TALE OF COMPRESSED GAS

[75] Inventors: Wm. Gregory Lowe; Joseph D. Francis, both of Ogden, Utah

[73] Assignee: Morton International, Inc., Chicago, Ill.

[21] Appl. No.: 648,459

[22] Filed: May 15, 1996

[51] Int. Cl.$^6$ ............................................. B60R 21/26
[52] U.S. Cl. .............................. 280/736; 280/741
[58] Field of Search ............................. 280/736, 737, 280/741

[56] References Cited

U.S. PATENT DOCUMENTS

| | | | |
|---|---|---|---|
| 3,345,876 | 10/1967 | Smith | 116/266 |
| 3,492,968 | 2/1970 | Workman, Jr. | 116/270 |
| 3,771,121 | 11/1973 | Lohr | 340/52 R |
| 3,818,764 | 6/1974 | Wagner | 73/393 |
| 3,944,769 | 3/1976 | Wagner | 200/83 A |
| 4,049,935 | 9/1977 | Gruber | 200/83 P |
| 4,095,624 | 6/1978 | Davis | 280/737 |
| 4,394,033 | 7/1983 | Goetz et al. | 280/736 |
| 5,033,772 | 7/1991 | Frantom et al. | 280/741 |
| 5,225,643 | 7/1993 | Marchant | 200/834 |
| 5,296,659 | 3/1994 | Potts et al. | 200/83 J |
| 5,351,527 | 10/1994 | Blackburn et al. | 73/52 |
| 5,356,176 | 10/1994 | Wells | 280/737 |
| 5,360,232 | 11/1994 | Lowe et al. | 280/741 |
| 5,429,387 | 7/1995 | Clark et al. | 280/737 |
| 5,474,328 | 12/1995 | Nilsson | 280/737 |
| 5,496,062 | 3/1996 | Rink et al. | 280/737 |

*Primary Examiner*—Kenneth R. Rice
*Attorney, Agent, or Firm*—Corinne R. Gorski; Gerald K. White

[57] ABSTRACT

A device for sealing a gas fill port of an inflator of a vehicle restraint system, for providing pressure release of gases during bonfire of the inflator. During normal functioning of the inflator, the device can be examined to indicate the amount of compressed gas present in the inflator at the time of deployment. In one embodiment, a seal seals the fill port of the inflator. The seal is made of a material which melts at or just below auto-ignition temperature of the inflator during bonfire to allow the gases to vent from the inflator chamber, thereby preventing the inflator from experiencing extremely high internal pressures. Another embodiment of the device seals the fill port of the inflator and also acts as a tell-tale device, whereupon examination of the device after deployment, the amount of gas present in the inflator at the time of functioning can be determined.

3 Claims, 2 Drawing Sheets

DEVICE FOR PRESSURE RELIEF DURING BONFIRE AND TELL-TALE OF COMPRESSED GAS

This application is related to copending applications Ser. No. 08/558,358, entitled "Temperature Adjusting Low Pressure Sensor"; Ser. No. 08/600,844, entitled "Tell-Tale Indicator to Provide Evidence of the Proper Amount of Gas in an Inflator at the Time of Deployment"; Ser. No. 08/587,615, entitled "Post Deployment Fill Status Indicator"; Ser. No. 08/584,903 entitled "Wire-Wrap Low Pressure Sensor for Pressurized Gas Inflators."

BACKGROUND OF THE INVENTION

1. Field of the Invention

The present invention relates to a device for sealing a gas fill port of an inflator of a vehicle safety restraint system and for providing pressure relief of gases during bonfire of the inflator, as well as, a tell-tale device to determine the amount of compressed gas in the inflator prior to normal deployment of the inflator.

2. Description of the Related Art

Numerous types of inflators have been disclosed in the prior art for expanding an inflatable air bag of a vehicle safety restraint system. One type of inflator utilizes a quantity of high pressure gas stored in a storage cylinder or body, which is selectively released to inflate the air bag. Another type of inflator derives the gas source from a combustible gas generating material which, upon ignition, generates a quantity of hot gas for inflating the air bag.

In still another type, the inflator includes both stored compressed gas and combustible pyrotechnic gas generating material. Such an inflator is referred to as a hybrid inflator, an example of which is disclosed in U.S. Pat. No. 5,360,232, assigned to the assignee of the present invention, and herein incorporated by reference.

For example, a hybrid inflator functions as follows, upon receiving a control signal, an initiator fires and drives a projectile through a burst disc and cold gas begins to vent. The projectile continues and strikes an actuation assembly which in turn strikes two primers. The primers fire and ignite an ignition material which force ignites grains of a pyrotechnic gas generating material. Much of the heat energy of the burning pyrotechnic grains is transferred to the compressed gas in the storage chamber of the inflator. This heated gas is vented into the air bag assembly to provide sufficient fill of the airbag cushion to prevent injury to the vehicle passenger.

A disadvantage of the hybrid inflator is that failure of the inflator pressure vessel can occur during bonfire. In addition to steel and in order to satisfy light weight specifications, aluminum or an aluminum alloy could be used for the inflator housing. Such materials will not experience problems during normal use, such as during deployment in the event of a collision. However, if the inflator is exposed to a high temperature environment, such as a bonfire, for example, encountered during storage or shipping or in the event of a vehicle fire, the lightweight inflator housing structure can degrade tending to rupture or burst, projecting fragments in all directions.

The inflator can degrade due to the combination of an already high inflator bottle pressure associated with heating during the bonfire, coupled with the faster burn rate associated with this increased pressure. This drives the bottle pressure even higher, resulting in an even faster burn rate, until the pressure rises faster than the diffuser can vent the gas, thus resulting in inflator fragmentation.

Damage to the inflator can also occur from the grains of the pyrotechnic material which may fragment if exposed to elevated temperatures, such as the temperatures experienced during bonfire, for a period of time accompanied by a sudden depressurization. As the compressed gas vents rapidly, i.e., in less than one second, the grain cells rupture, resulting in greatly increased burn area. Because of this greatly increased burn area, once the booster charge from the initiator auto-ignites the grain during bonfire, it can explode, resulting in damage to the inflator pressure vessel.

Another disadvantage of an inflator which utilizes compressed gas, is that the gas may leak out over long periods of time. If the gas pressure of the bottle falls below a predetermined level due to an undetected gas leak, sufficient fill of the airbag will not occur, the effectiveness of the airbag would degrade and the system will not operate properly. Moreover, since the gas generation process produces large thermal and mechanical stresses, the inflator must be able to withstand these forces. However, if not enough stored gas is present in the inflator at the time of ignition of the pyrotechnic material, the heat energy of the pyrotechnic will not be adequately absorbed by the remaining stored gas but will be transfered to the inflator housing.

It is known to monitor the pressurized bottle containing the stored gas to detect loss of pressure in a pressurized vessel, with such loss being attributed to a leak in the vessel or other damage to the vessel. See U.S. Pat. Nos. 3,771,121, 4,049,935 and 5,296,659. U.S. Pat. No. 5,225,643, assigned to the assignee of the present invention, discloses a differential pressure switch disposed within a pressurized vessel.

However, with the above-described devices, these sensors are placed directly within the bottle which introduces additional, significant leak paths which could cause leaks and thus make the inflator inoperable. Another disadvantage is that the sensors require communication from inside the inflator bottle to the dashboard of the automobile to monitor the sensors. Additional wiring and alert signals in the dashboard to monitor the sensors must be provided, increasing manufacturing costs.

Still another disadvantage with known inflators, is that the fill port used to pressurize the inflator gas storage chamber often introduces an additional leak path for the stored gas.

Thus, there is a need for an inflator which seals the fill port and also provides pressure relief of gases generated during bonfire, to prevent the inflator from degrading and rupturing.

SUMMARY OF THE INVENTION

An object of the present invention is to provide a device which provides pressure relief of gases from the inflator during bonfire of the inflator.

Another object of the present invention is to provide a device which seals the inflator pressure vessel after gas fill, eliminating an additional leak path currently associated with known low pressure sensors.

A further object of the present invention is to provide a tell-tale device which, upon normal functioning of the inflator, can be examined after deployment to determine if there was sufficient compressed gas within the inflator. The present invention provides a less-expensive alternate to costly low pressure sensors currently being used.

In accomplishing these and other objectives of the present invention, there is provided a device for sealing a gas fill port of an inflator of a vehicle restraint system, and for providing pressure release of gases during bonfire of the inflator. The device comprises means for sealing the fill port of the inflator. The sealing means is made of a material which melts at or just below auto-ignition temperature of the inflator during bonfire to allow the gases to vent from the chamber, thereby preventing the inflator from experiencing high internal pressures.

During normal functioning of the inflator, i.e., when the inflator has not been subject to bonfire temperatures, the sealing means will not melt or be expelled from the gas fill port and the sealing means will perform as a tell-tale device, deforming an amount which is proportional to the amount of pressurized gas present inside the inflator prior to deployment. This amount of deformation can be examined post deployment to determine the amount of pressurized gas present inside the inflator at the time of functioning.

The present invention has the greatest application in a compressed gas inflator where the pressure of the gas increases dramatically as the temperature rises. In one embodiment, the sealing means comprises a seal disposed in communication with the fill port of the inflator. In another embodiment, the fill port is covered with a coating of sealant which burns, scars or degrades an amount proportional to the amount of stored gas present in the inflator at the time of normal functioning.

The material of the seal melts or softens enough at or just below auto-ignition temperatures of the inflator during bonfire, such that the rising temperature and pressure forces of the gas would melt or expel the seal. With the seal displaced, an additional opening is provided, increasing ventilation for the exiting gas, such that the inflator internal pressure does not rise to a hazardous level and the structural integrity of the inflator would not be compromised.

Other features and advantages of the present invention will become apparent from the following description of the invention which refers to the accompanying drawings.

DETAILED DESCRIPTION OF THE PREFERRED EMBODIMENTS

Figure 1:
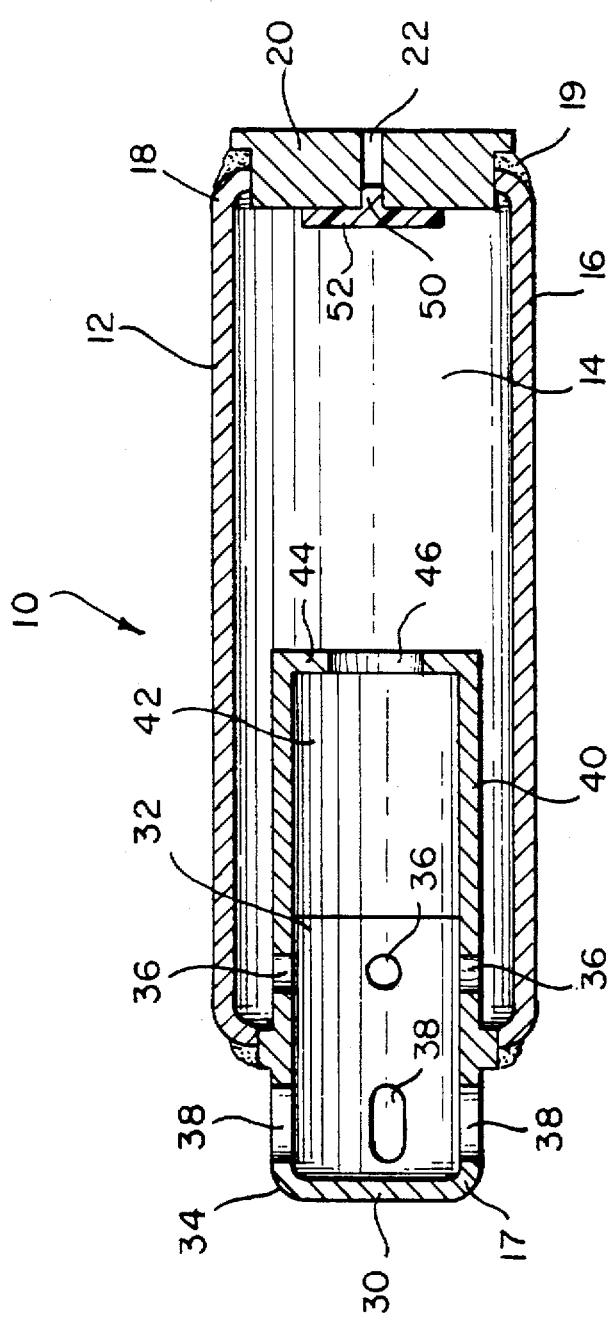
FIG. 1 is a cross-sectional view of a hybrid inflator assembly incorporating a first embodiment of the sealing, pressure relieving and tell-tale device of the present invention.

Referring to the drawings, there is shown a hybrid inflator assembly 10 for inflating an airbag. The inflator assembly comprises a pressure vessel 12, preferably made of steel or an aluminum alloy, including a storage chamber 14 which is filled and pressurized with a compressed storage gas, for example, an inert gas, such as Argon or Nitrogen, to a pressure typically in the range of 2000–4000 psi. It should be appreciated that the device of the present invention is not limited to use in only a hybrid inflator assembly or a passenger side inflator assembly.

The chamber 14 is defined by an elongated cylindrical sleeve 16. A fill plug 20 is attached to a first end 18 of sleeve 16 by a circumferential weld 19. Fill plug 20 includes a passage or fill port 22 through which the gas to be stored can be delivered into chamber 14.

A pyrotechnic housing 40 is recessed in sealing relation into chamber 14 from a second end 17 of sleeve 16. The pyrotechnic housing 40 includes a chamber 42 for storing therein a supply of pyrotechnic material 43, for example, a granular mixture of $BKNO_3$ (not shown). Upon ignition of an ignitor material (not shown), the pyrotechnic material burns to produce a generated gas. Chamber 42 includes an end portion 44 having a central opening or nozzle 46, wherethrough the hot gas generated upon ignition of pyrotechnic material 43 is released into chamber 14 where the generated hot gas heats and augments the stored gas.

The pyrotechnic housing 40 also includes an inflator diffuser 30 adjacent and integral with the pyrotechnic chamber 42. Diffuser 30 comprises a generally cylindrical sleeve joined at a first end 32 to storage chamber 42. A second opposite end 34 of diffuser 30 extends externally from the container 12. Generally equally spaced controlling orifices 36 provide passage into diffuser 30 of inflation gas from container 12. This inflation gas can then exit the inflator assembly 10 by means of a plurality of gas exit ports 38 spaced about and adjacent second end 34 of diffuser 30.

The present invention provides a device which both seals the fill port 22 and provides pressure relief of gases during bonfire. As shown in FIG. 1, the device comprises a seal 50 made of a material 52 which seals fill port 22. In known prior art inflators, the fill port is sealed by a steel ball which is driven into the port and welded therein.

The material 52 can be a thermoplastic, as well as, tin, lead or an alloy having a low temperature melting point. The seal 50 can cover the interior end of port 22 and can extend within port 22 by a slight amount. In this manner, the seal can be injected into port 22 in a softened state such that the seal material will expand outwardly to cover the port. Seal 50 can also be adhered to the end of port 22 by adhesive, or other known attachment means.

The material of seal 50 melts or softens at the appropriate bonfire temperatures, for example, 450° F. to 500° F., at or just below the pyrotechnic auto-ignition temperature. Upon auto-ignition, the energy of the generated gases will be directed toward the seal. The seal material will melt or burn away during bonfire causing the pressurized gas in chamber 14 to vent before pressure becomes critical and bursts the inflator vessel. If the material is only softened and not melted, the rising pressure forces of the gas would expel the remaining portion through fill port 22. Moreover, venting of the compressed gas in a relatively slow manner through port 22 prior to auto-ignition of the pyrotechnics would help prevent the grains of pyrotechnic from fragmenting.

Thus, port 22 provides an additional escape path for the gas. If the material 52 melts below the auto-ignition temperature, no gas would be present in the inflator when auto-ignition of the pyrotechnics occurs. If the material melts at or near the auto-ignition temperature, the softened material would be sufficiently deteriorated in strength, such that the increased pressure caused by the rising temperature would expel the seal, creating an additional egress path for the pressurized gas exiting from the inflator. This additional exit path would prevent the inflator from experiencing extremely high internal pressures and would reduce the probability of failure of the inflator pressure vessel due to such an over-pressurization. The seal device of the present invention also provides pressure relief for inflators which utilize higher strength burst discs.

If bonfire does not occur, the inflator is still able to function normally. In this illustration, although the device of the present invention would not be required to act as a pressure relief, the device can also act as a tell-tale for indicating the amount of gas present in chamber 14 at the time of normal deployment. During normal functioning of the inflator, the energy generated from the pyrotechnic will mostly be transferred to the end of the chamber and hence, the seal 50 containing the low temperature melting material 52. Material 52 burns, scars or degrades, the amount of which can be examined upon disassembly of the inflator to determine the amount of gas present in the inflator.

If the inflator has not lost pressure, more of the heat energy from the pyrotechnic will be transferred to the stored gas. However, as the gas mass is lowered, i.e., due to a leak in the inflator, the less the heat energy that the stored gas can absorb, and more of the energy from the pyrotechnic will be transferred to the seal 50, hence burning, degradation or scarring of the seal 50. The device of the present invention will detect this lower gas mass by degrading to a higher degree when subjected to this additional energy.

Figure 2:
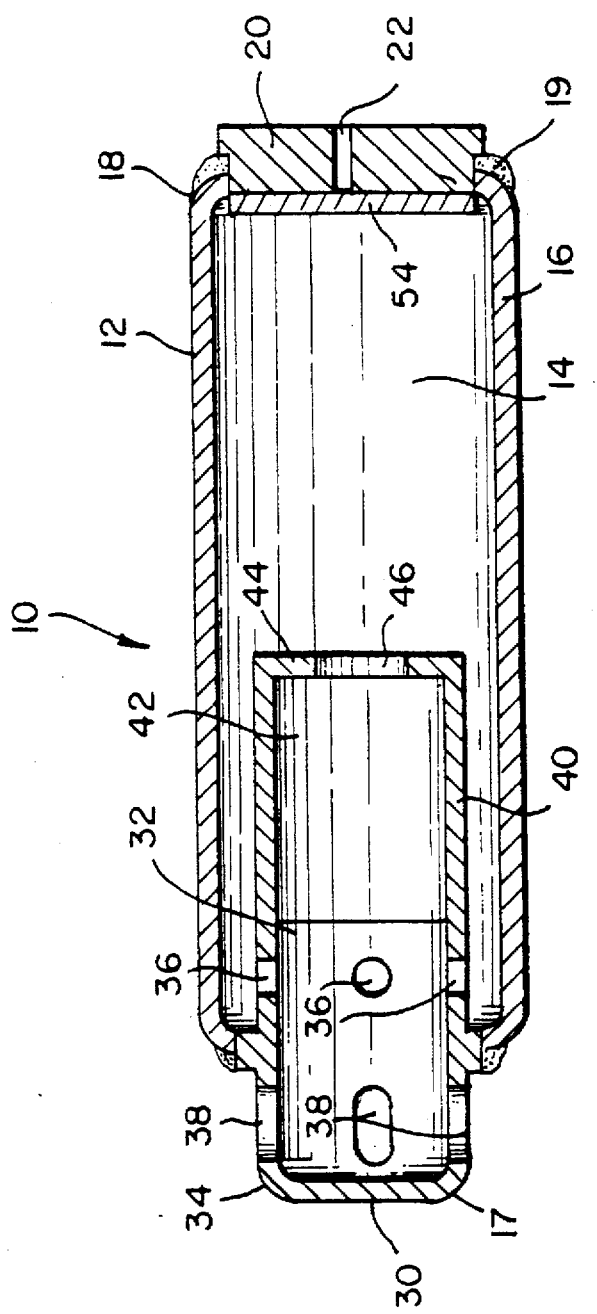
FIG. 2 is a cross-sectional view of a hybrid inflator incorporating another embodiment of a tell-tale device according to the present invention.

In another embodiment, shown in FIG. 2, a coating of sealant 54 can be applied to one end of plug 20, covering fill port 22. This embodiment will not function as a device for releasing pressure during bonfire, but solely as a tell-tale device.

After deployment of the inflator, the sealant coating 54 can be examined and the amount of deformation observed, with the deformation being proportional to the amount of gas present prior to deployment. Thus, the device does not monitor the inflator gas continuously, but takes a measurement only at the time of airbag deployment and is used solely during post-deployment inspection to deduce the amount of gas present in the inflator just prior to functioning.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for sealing a gas fill port of an inflator of a vehicle restraint system, and for providing pressure relief of gases during bonfire of the inflator, comprising:

means for sealing the fill port of the inflator, the sealing means being made of a material which melts at or just below an auto-ignition temperature of the inflator during bonfire to allow gases to vent from the inflator, thereby preventing the inflator from experiencing extremely high internal pressures, and wherein the sealing means deforms an amount which is proportional to the amount of gas present in the inflator prior to deployment, and the amount of deformation can be examined after functioning of the inflator to determine the amount of gas present in the inflator.

2. The device of claim 1, wherein the means for sealing the fill port comprises a seal sealing the fill port of the inflator.

3. The device of claim 1, wherein the material of the sealing means is selected from the group comprising thermoplastic, tin lead and an alloy having a low temperature melting point.

* * * * *